United States Patent [19]

Avery

[11] 4,157,060
[45] Jun. 5, 1979

[54] VISCOSITY CONTROLLED EGG COOKER

[76] Inventor: Robert W. Avery, Apt. 62, 4650 SW. 145th St., Beaverton, Oreg. 97005

[21] Appl. No.: 761,816

[22] Filed: Jan. 24, 1977

Related U.S. Application Data

[63] Continuation of Ser. No. 640,743, Dec. 15, 1975, abandoned.

[51] Int. Cl.² ............................................. A23L 1/32
[52] U.S. Cl. ..................................... 99/325; 99/331; 73/54
[58] Field of Search ................. 99/325, 336, 440, 331, 99/326; 73/54, 52; 426/233

[56] References Cited

U.S. PATENT DOCUMENTS 3,382,706  5/1968  Fitzgerald et al. ..................... 73/54

FOREIGN PATENT DOCUMENTS 587058  4/1947  United Kingdom ..................... 99/331

Primary Examiner—Richard E. Aegerter
Assistant Examiner—Willis Little
Attorney, Agent, or Firm—Klarquist, Sparkman, Campbell, Leigh, Hall & Whinston

[57] ABSTRACT

An apparatus for cooking eggs is described in which the control of cooking is based upon indirect measurement of viscosity of the contents of one of the eggs being cooked. Viscosity is measured by oscillating the egg in rotation at a frequency determined by the spring constant of the system and at a constant torque while measuring the amplitude of oscillation. When, due to cooking, the amplitude of oscillation, which is a function of the viscosity of the egg contents, increases to a preset threshold, cooking is automatically terminated.

15 Claims, 2 Drawing Figures

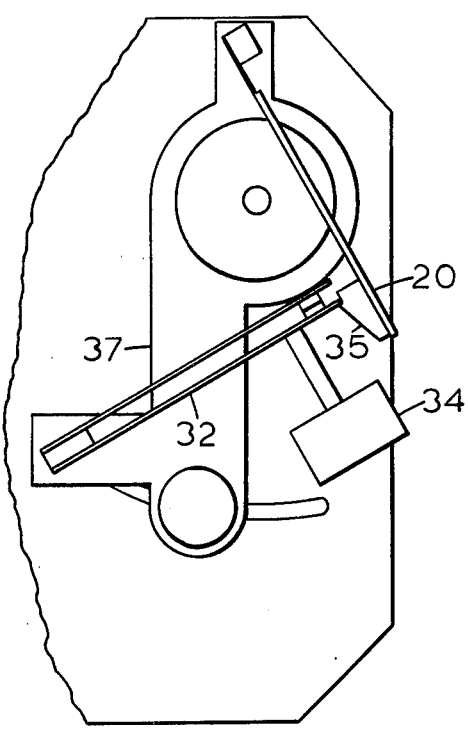
Fig-2-

VISCOSITY CONTROLLED EGG COOKER

This is a continuation of application Ser. No. 640,743 filed Dec. 15, 1975 now abandoned.

BACKGROUND OF THE INVENTION

This invention relates to the control of cooking of eggs, particularly by viscosity measurement techniques. The cooking of eggs is commonly controlled automatically by the regulation of cooking time. However, the relationship between cooking time and degree of cooking is complex and the quality of eggs cooked by known cookers is variable and dependent upon user skills. Correct cooking time is a function of the number of eggs being cooked simultaneously as well as egg size, initial egg temperature and initial water temperature if used. Known egg cookers compensate for only the first of these variables, but this invention compensates automatically for all of these variables more or less.

SUMMARY OF THE INVENTION

Accordingly, it is an object of this invention to increase the directness with which the degree of cooking is used in the control of egg cookers.

A related object is to improve the quality of eggs cooked by this method.

Another object of this invention is to reduce the amount of effort required by the operator for cooking eggs.

A further object of this invention is to reduce the complexity of the operator's tasks in cooking eggs.

To accomplish the foregoing and related objects, the invention provides for indirect measurement of viscosity of the contents of one of the eggs being cooked, said measurement serving to automatically control the termination of cooking.

In a specific aspect of the invention, the indirect sensing or measurement of viscosity of the egg contents is obtained by oscillating in rotation, by means of a constant torque drive mechanism the egg and its supporting structure including a restoring spring, at the natural frequency of oscillation which is the frequency at which maximum amplitude of oscillation occurs. The amplitude of the resulting oscillation, which is a function of viscosity of the egg contents and degree of cooking of the egg, is measured.

When a body being oscillated reaches equilibrium, the rate of its rotational energy loss is equal to the rate of rotational energy input. In a system in which the drive torque and therefore the rate of energy input at a given frequency is constant, the rate of energy loss by damping at that frequency also remains constant and the resultant equilibrium amplitude of oscillation is that which is necessary to maintain the constant rate of energy loss. Any change in damping charasteristic of the oscillating mass, such as occurs in eggs during cooking causes a compensating change in the ability of the egg to dissipate rotational energy and turns in the amplitude of oscillation so that a constant rate of rotational energy loss for a given frequency of oscillation is maintained.

Damping is caused by resistance to variation in the rate of turning the egg or oscillation primarily because of drag of the egg contents. In U.S. Pat. No. 3,181,348 it is shown that the damping of an oscillating body containing a viscous fluid is a function of the viscosity of the fluid and is at a maximum at a given frequency characteristic of the viscosity of the fluid. Therefore, any change in viscosity, or frequency of oscillation causes a change in damping characteristic or resistance to turning which causes a compensating change in amplitude of oscillation.

The frequency of oscillation varies with the moment of inertia of the oscillatable structure including the egg being cooked as defined in the formula:

$$F = 1/2\pi \sqrt{I/R_s}$$

where:
F = Frequency
I = Moment of inertia of the oscillatable structure including the egg
$R_s$ = Spring rate of the oscillating system Moment of inertia of the egg is a function of mass and dimensions of the egg as well as degree of cooking. The moment of inertia of an uncooked egg is less than the moment of inertia of a rigid body of the same mass and dimensions because, as the egg is oscillated, the contents tend to slip with respect to the shell or container and therefore to remain more or less stationary. During cooking as the viscosity of the egg contents increases, the amount of slip of the contents with respect to the shell or container decreases and therefore the moment of inertia increases causing a decrease in the natural frequency of oscillation of typically 35 percent for eggs in the shell. As cooking occurs, changes in viscosity and moment of inertia of the egg contents result in an initial decrease in the amplitude of oscillation of the oscillatable structure followed by an increase in amplitude to a level significantly higher than the initial amplitude. Means responsive to the amplitude of oscillation of the oscillatable structure can automatically terminate cooking if the amplitude of oscillation increases, and hence the resistance of the egg to variations in turning decreases, to a preset threshold.

Other aspects of the invention will become apparent after considering the illustrative embodiment taken in conjunction with the figures.

BRIEF DESCRIPTION OF THE DRAWINGS

FIG. 2 is a plan view of a fragment of the egg cooker illustrating an alternative means for adjusting the degree of cooking of the eggs.

DESCRIPTION OF PREFERRED EMBODIMENT

Figure 1:
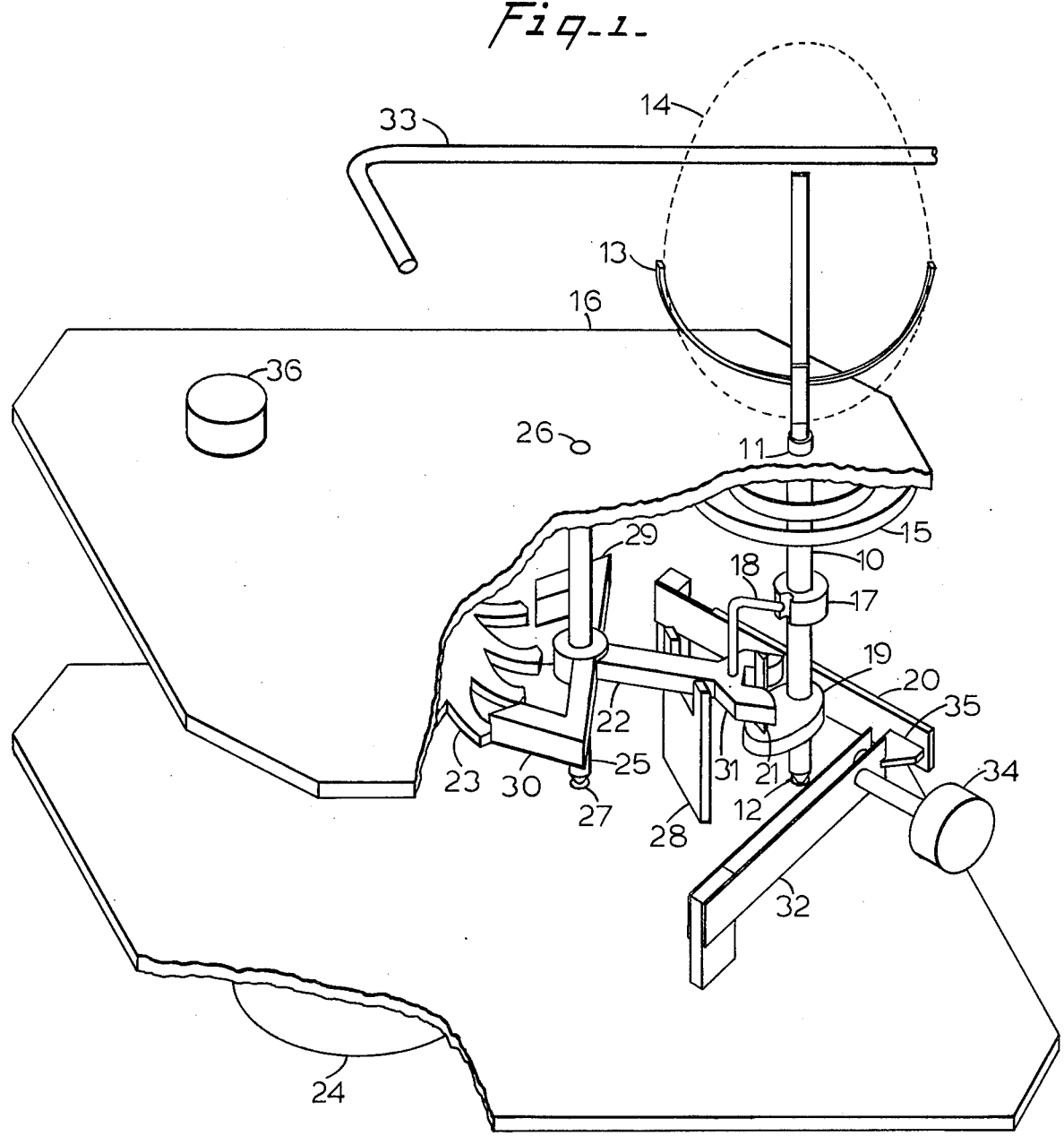
FIG. 1 is a perspective view of an egg cooker according to the invention.

Shown in FIG. 1 is a mechanical system comprising an oscillatable structure for supporting one of the eggs being cooked, a driven escapement of a type commonly utilized in timepieces for oscillating the oscillatable structure, and switched means for heating the eggs.

The oscillatable structure is comprised of a balance staff 10 supported by two bearings 11 and 12, a holder 13 rigidly attached to one end of the balance staff into which the egg to be cooked 14 in its shell or in a container is placed, a helical restoring spring 15 positioned coaxially about the balance staff with its inner end rigidly attached to the balance staff and its outer end rigidly attached to the frame 16 thereby applying a restoring force to the balance staff which is proportional to the deflection of the balance staff and opposite in sign, an upper roller 17 also mounted rigidly on the balance staff and having a groove in its periphery for receiving the safety finger 18, a lower roller 19, the periphery of which acts as a switch tripping member or cam surface for engaging the switch or extinguishing element 20.

The lower roller which is rigidly mounted on the balance staff also rigidly supports the impulse pin 21 which couples the drive forces to and thereby causes oscillation of the balance staff.

The lever type escapement is comprised of a lever 22 and an escape wheel 23. The escape wheel is rigidly mounted upon the shaft of an electric motor 24 which produces a constant drive torque. The required degree of torque stability can be achieved with one of several types of commonly used electric motors energized by a conventional unregulated current source. The lever is mounted upon an arbor 25 and oscillates in rotation in two bearings 26 and 27 through a fixed arc limited by the banking pins 28. The driven end of the lever is comprised of two pallets 29 and 30 each with an inclined impulse face which engages the tips of the escape wheel thereby alternatingly locking and receiving impulses from the escape wheel which therefore rotates in periodic steps. The electric motor is stalled when the escape wheel is locked. At the driving end of the lever is a fork 31 which engages and drives the impulse pin in an arc. The arc through which engagement of the fork and impulse pin takes place is fixed by the banking pins and is at times a fraction of the total arc of the impulse pin. A constant rate of rotational energy input to the oscillatable structure at a given frequency is achieved by driving the impulse pin at a constant torque through a fixed arc. The total arc of the impulse pin equals the fixed arc together with the arc through which the impulse pin travels by residual turning beyond the fixed arc due to the input of energy during the fixed arc and is that which is necessary to maintain a rate of rotational energy loss by damping primarily of the egg contents which equals the rate of energy input to the oscillatable structure. As the damping characteristic of the egg contents changes during cooking, the total arc and hence residual turning of the impulse pin undergoes compensating changes.

Also rigidly attached to the driving end of the lever is the safety finger which engages the groove in the upper roller, thereby preventing significant movement of the lever except during the driven portion of the arc of the impulse pin. A complete description of the functioning of the lever escapement is given in: Watches, Their History, Decorations and Mechanism pp 285 through 292, written by G. H. Baillie and published by Methuen & Co., Ltd., London 1928.

Cooking is terminated by rotation of the cam surface of the lower roller into engagement with the spring loaded extinguishing element causing it to move radially outward unlatching and thereby opening the contacts 32 which constitute the current switching means for holding energized the electric heater 33 and the electric motor.

Cooking is initiated by depressing the start button 34 which is affixed to the outer contact causing that contact to move inward over the surface of the insulating ramp 35 where the contacts are latched closed until released at the termination of cooking by the movement of the extinguishing element described earlier.

The degree of cooking can be manually changed by adjusting the rheostat 36 which controls motor current thereby changing drive torque. An alternative means of changing the degree of cooking which is illustrated in FIG. 2 is by changing the relative position of the extinguishing element and the cam surface of the lower roller such as by rotation of a mount 37 which supports an assembly of functional elements comprising the extinguishing element, contacts, start button and ramp about the axis of the balance staff.

To cook an egg in accordance with the invention, the egg is placed in the holder and, if desired, additional eggs are placed adjacent to the heat source for simultaneous cooking. The additional eggs need not be oscillated, however, differences between the rate of heat flow to the oscillated egg and the additional eggs or differences in volume between the oscillated egg and the additional eggs cause differences in the relative degree of cooking.

For cooking eggs in the shell, the cooker functions with any orientation of the oscillated egg, however differences in orientation of the major axis of the oscillated egg with respect to the axis of the balance staff cause differences in the degree of cooking of the egg.

Cooking is initiated by depressing the start button which latches the contacts closed thereby energizing the electric motor and electric heater. Motor torque causes the escape wheel to move in rotation thereby imparting energy to the lever which therefore moves in an arc carrying with it the impulse pin, causing rotation of the balance staff. As the lever approaches the limit of its arc, the pallet engages a tip of the escape wheel, temporarily locking the escape wheel with the lever resting against the banking pin. The impulse pin continues to rotate out of engagement with the fork carried by the inertia of the oscillating structure. The motion of the impulse pin and the oscillating structure to which it is attached is finally arrested and reversed by the force of the restoring spring whereupon the impulse pin moves backward into engagement with the fork causing sufficient movement of the lever to unlock the escape wheel and thereby initiate the second half of the cycle of oscillation. The escapement continues to oscillate the oscillatable structure at its natural frequency and at an amplitude dependent upon the viscosity of the contents of the egg as long as the electric motor is energized.

When, because of cooking, the viscosity of the contents of the egg increases to the preset threshold, the cam surface of the lower roller rotates into engagement with the extinguishing element thereby unlatching the contacts causing them to spring open thus terminating cooking and indicating the degree of cooking of the egg.

Other adaptations and modifications of the invention will occur to those skilled in the art.

What is claimed is:

1. An apparatus for heating an egg in a cooking process comprising:
    heating means for heating an egg to vary the degree of cooking of the contents of the egg;
    sensing means for sensing the degree of cooking of said contents, said sensing means comprising means for sensing the viscosity of said contents to thereby sense the degree of cooking of said contends, and
    indicating means responsive to said sensing means for indicating the degree of cooking of said contents, said indicating means comprising means for indicating a predetermined degree of cooking of said contents, and in which said indicating means includes means for indicating a predetermined threshold of the viscosity of said contents to thereby indicate the predetermined degree of cooking of said contents.

2. An apparatus according to claim 1 including adjustment means for varying the predetermined degree of cooking of said contents.

3. An apparatus according to claim 1 wherein the sensing means includes means for terminating the heating of the heating means to indicate the predetermined degree of cooking of said contents.

4. An apparatus for heating an egg in a cooking process comprising:
   means for turning the egg and varying the rate of said turning;
   heating means for heating the egg to cause the contents within the egg shell to gradually harden whereby to gradually decrease the resistance of the egg to a variation in turning movement;
   sensing means for sensing and indicating a predetermined decrease in said resistance.

5. An apparatus according to claim 4 wherein the means for turning the egg comprises oscillating means for oscillating the egg.

6. An apparatus according to claim 5 wherein the sensing means includes means for ending the heating of the heating means to indicate the predetermined decrease in resistance.

7. An apparatus according to claim 5 in which said oscillating means comprises means for increasing the amplitude of the oscillations of the egg as said resistance decreases, and in which the sensing means senses and indicates a predetermined amplitude of the oscillations.

8. An apparatus according to claim 7 wherein the means for turning the egg continuously oscillates the egg until the predetermined amplitude of the oscillations is indicated.

9. An apparatus for heating an egg in a cooking process comprising:
   a frame;
   support means pivotally mounted to the frame for supporting the egg;
   means for oscillating the support means in rotation;
   heating means for heating the egg to gradually cause the contents within the egg shell to harden whereby to gradually vary the amplitude of the oscillations of the support means;
   sensing means for sensing and indicating a predetermined amplitude of the oscillations.

10. An apparatus according to claim 9 wherein the support means includes an elongate shaft pivoted to the frame and holding means mounted to said shaft for holding the egg; and wherein the sensing means includes a switch tripping member mounted to the shaft and switching means for terminating the heating of the heating means, wherein the switch tripping member engages the switching means when the predetermined amplitude of the oscillations is reached to terminate the heating.

11. An apparatus according to claim 10 wherein the sensing means is adjustable to vary the predetermined amplitude of oscillations.

12. An apparatus according to claim 10 including means for adjusting the output torque of the motor to vary the amplitude of oscillations of the support means for a given degree of hardening of the contents of the egg.

13. An apparatus according to claim 9 wherein the means for oscillating the support means includes a motor having a generally constant torque output, an escapement means driven by the motor, driving means coupling the escapement means to the shaft for driving the shaft through a fixed arc during each cycle of oscillation of the shaft at a generally constant torque to maintain the egg in oscillation until the predetermined amplitude of oscillation is reached, and restoring spring means connected between the shaft and the frame.

14. An apparatus for heating an egg in a cooking process comprising means for imparting rotational energy to the egg contents, heating means for heating the egg to cause the contents within the egg shell to gradually harden whereby to decrease the ability of the egg to dissipate rotational energy, thereby increasing the egg's stored rotational energy, sensing means for sensing and indicating a predetermined threshold of rotational energy content of the egg.

15. An apparatus for heating an egg in a cooking process comprising means for turning the egg and varying the rate of turning, heating means for heating the egg to cause the contents within the egg shell to gradually harden whereby to gradually decrease the drag of the egg contents in opposition to a variation in turning movement, thereby increasing the amount of residual turning, sensing means for sensing and indicating a predetermined threshold of the residual turning of the egg.

* * * * *